(12) United States Patent
Niitsuma

(10) Patent No.: US 8,506,011 B2
(45) Date of Patent: Aug. 13, 2013

(54) VEHICLE SEAT AND VEHICLE SEAT ASSEMBLING METHOD

(75) Inventor: Kenichi Niitsuma, Tochigi-ken (JP)

(73) Assignee: TS Tech Co., Ltd., Saitama-Ken (JP)

( * ) Notice: Subject to any disclaimer, the term of this patent is extended or adjusted under 35 U.S.C. 154(b) by 850 days.

(21) Appl. No.: 11/995,684

(22) PCT Filed: Jul. 13, 2006

(86) PCT No.: PCT/JP2006/314003
§ 371 (c)(1),
(2), (4) Date: Feb. 2, 2010

(87) PCT Pub. No.: WO2007/007850
PCT Pub. Date: Jan. 18, 2007

(65) Prior Publication Data
US 2010/0270834 A1    Oct. 28, 2010

(30) Foreign Application Priority Data
Jul. 13, 2005   (JP) .................... 2005-203901

(51) Int. Cl.
*B60N 2/48* (2006.01)

(52) U.S. Cl.
USPC ................. 297/216.12; 297/452.18

(58) Field of Classification Search
USPC ......................... 297/216.12, 452.18
See application file for complete search history.

(56) References Cited

U.S. PATENT DOCUMENTS 5,795,019 A * 8/1998 Wieclawski ......... 297/216.12 X
6,783,177 B1 * 8/2004 Nakano ............... 297/216.12 X

FOREIGN PATENT DOCUMENTS

JP       2000211412 A  *  8/2000

* cited by examiner

*Primary Examiner* — Anthony D Barfield
(74) *Attorney, Agent, or Firm* — Browdy and Neimark, PLLC

(57) ABSTRACT

The vehicle seat of the invention has an active headrest mechanism for moving the headrest forward in the event of a rear-end collision. The active headrest mechanism is composed of a headrest support part in lateral direction provided with a vertical engaging part for supporting a pillar of the headrest, and an upside link mechanism for moving the headrest support part ahead of the backrest, and the upside link mechanism is mounted on the upper frame of one plate of the backrest frame by way of a bracket.

5 Claims, 8 Drawing Sheets

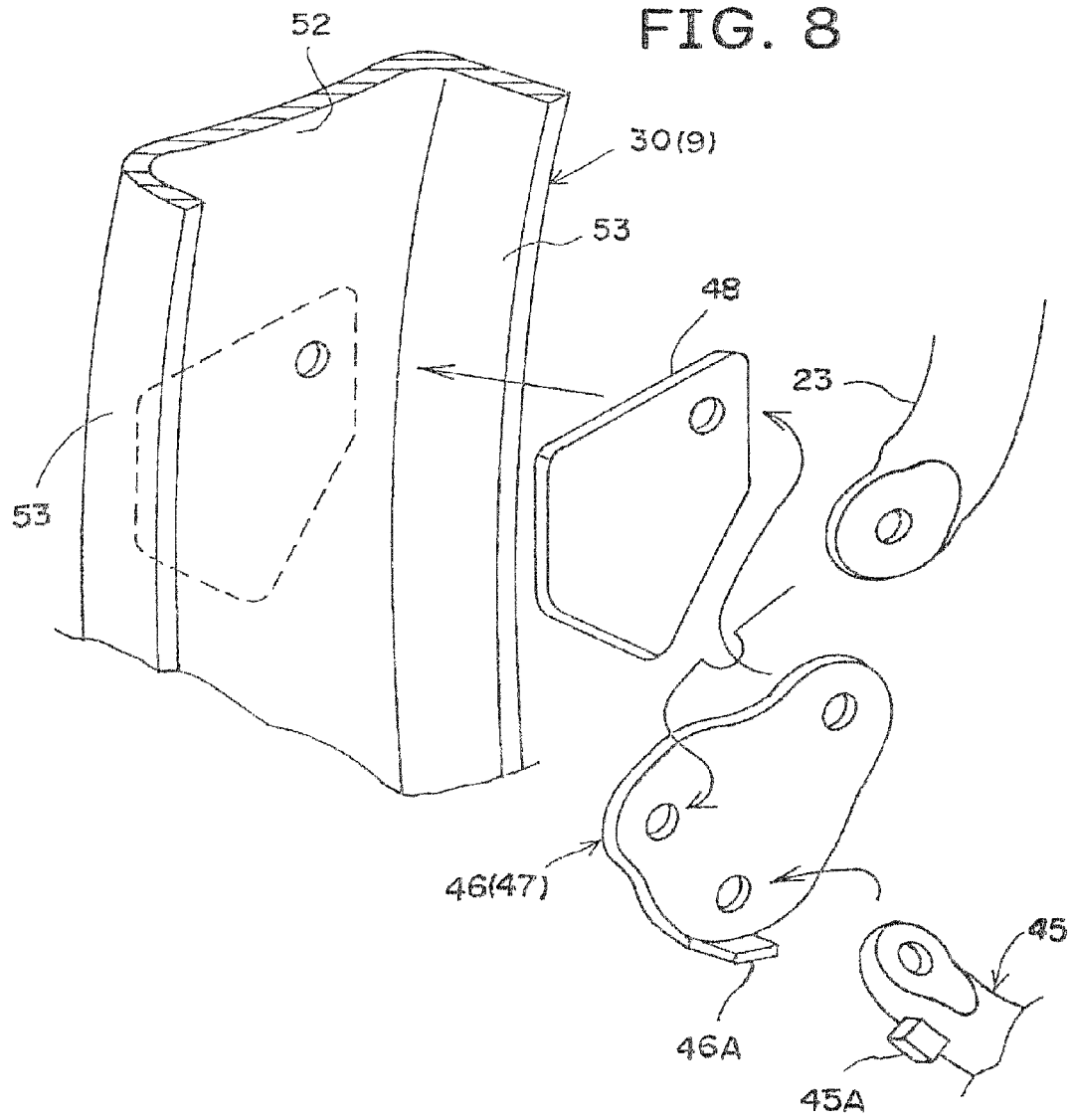

VEHICLE SEAT AND VEHICLE SEAT ASSEMBLING METHOD

TECHNICAL FIELD

The present invention relates to a vehicle seat, and more particularly to a vehicle seat provided with a headrest for moving from an ordinary support position to a head protecting position in the event of rear-end collision of a vehicle. The invention also relates to a method of assembling the vehicle seat.

BACKGROUND ART

A vehicle seat of the prior art includes a backrest frame, a collision detector provided in the backrest frame for moving backward when an occupant moves backward relatively to the backrest frame due to rear-end collision, and a headrest attached to the backrest frame, movable between an ordinary support position and a head protecting position ahead of the ordinary support position, and moving from the ordinary support position to the head protecting position when the collision detector moves backward.

Patent document 1: Japanese Patent Application Laid-Open No. 10-119619

DISCLOSURE OF THE INVENTION

It is a problem of this prior art that it is difficult to satisfy both assurance of rigidity of a backrest frame and reduction of weight of the backrest frame.

It is hence an object of the invention to provide a vehicle seat capable of satisfying both assurance of rigidity of the backrest frame and reduction of weight of the backrest frame at high levels.

BRIEF DESCRIPTION OF THE DRAWINGS

FIG. 8 is a perspective view of a downside link mechanism.

BEST MODE FOR CARRYING OUT THE INVENTION

Figure 1:
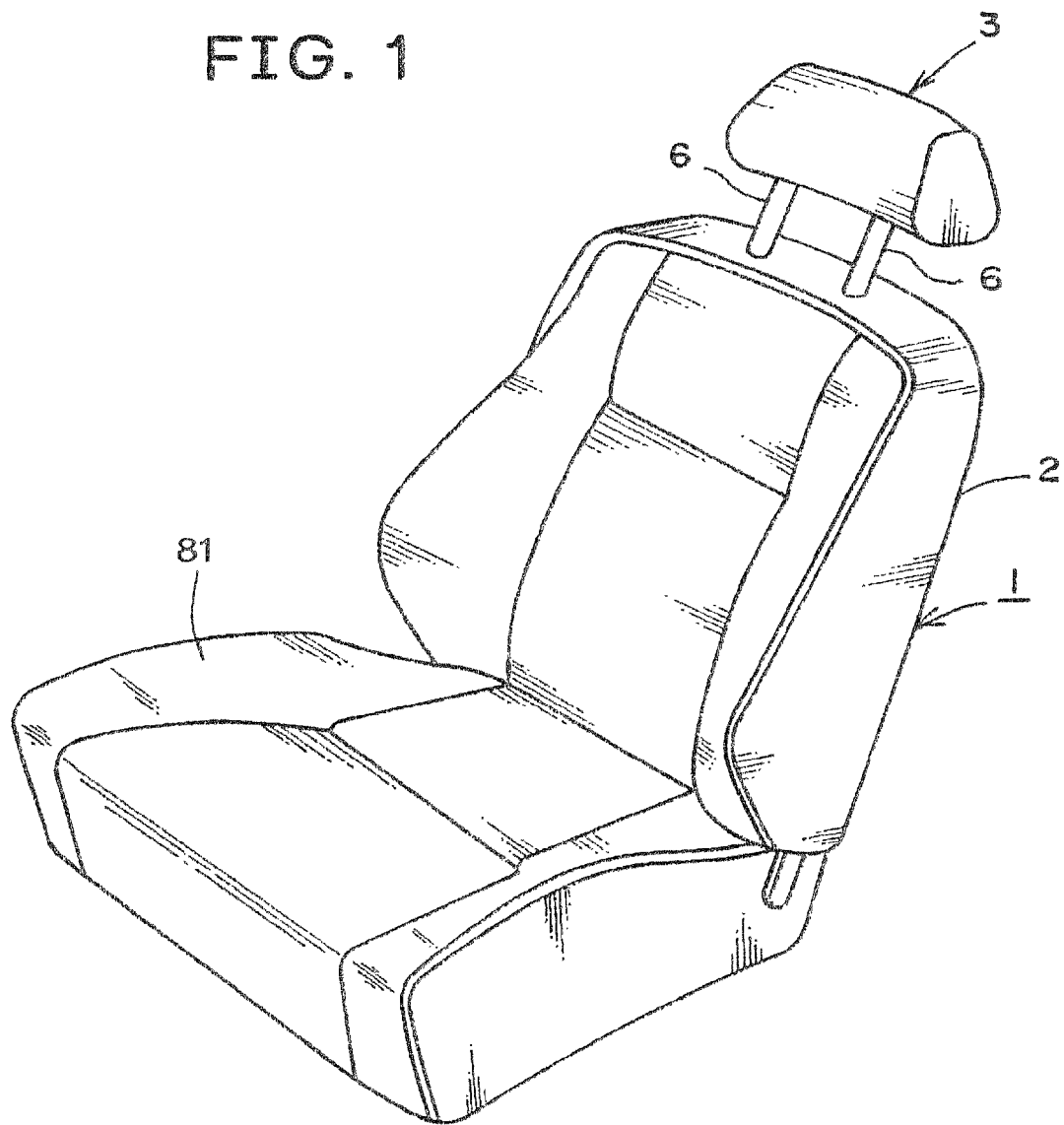
FIG. 1 is a perspective view of a vehicle seat.
Figure 2:
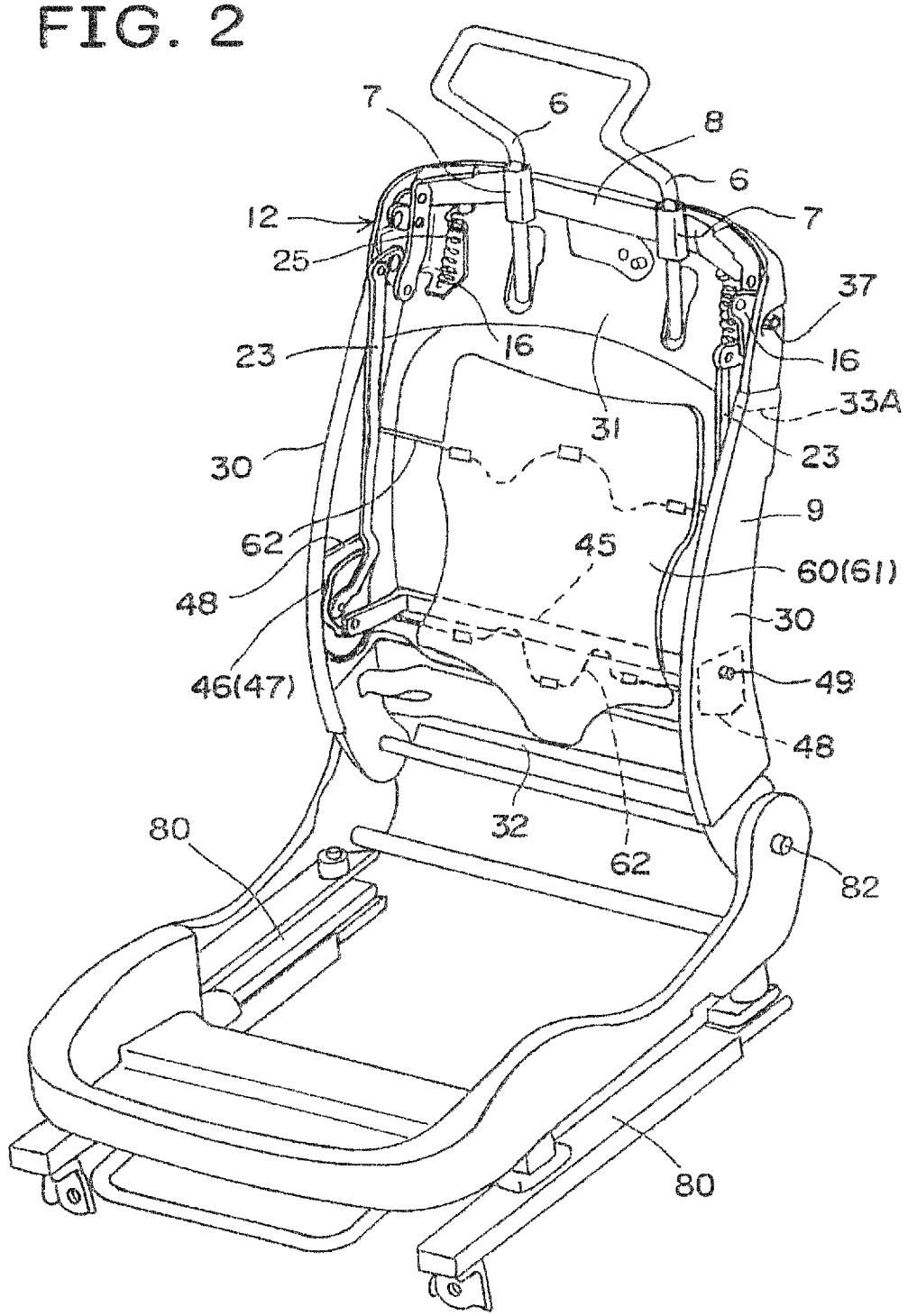
FIG. 2 is a perspective view of a backrest frame of the vehicle seat.
Figure 3:
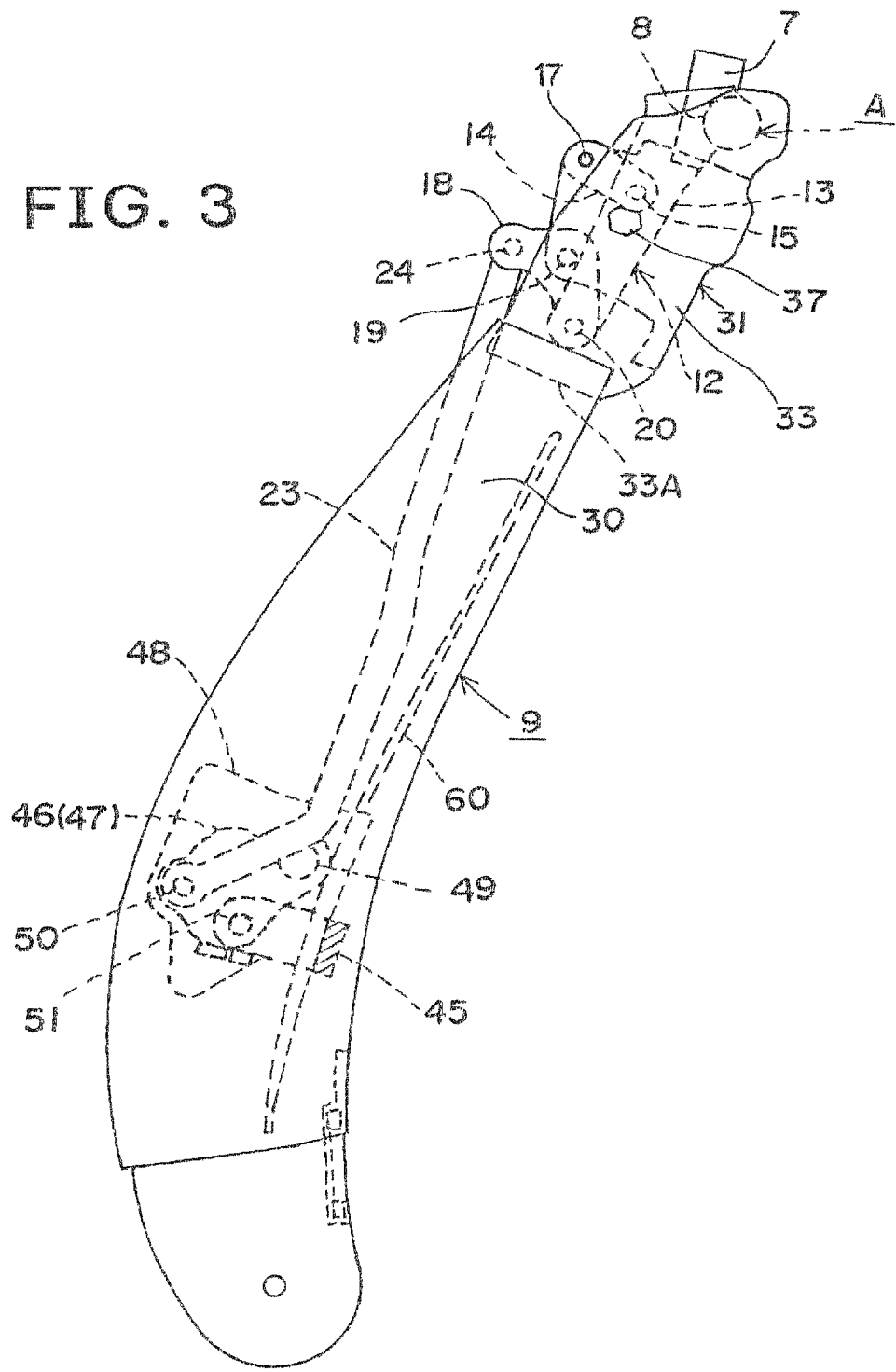
FIG. 3 is a side view of the backrest frame.
Figure 4:
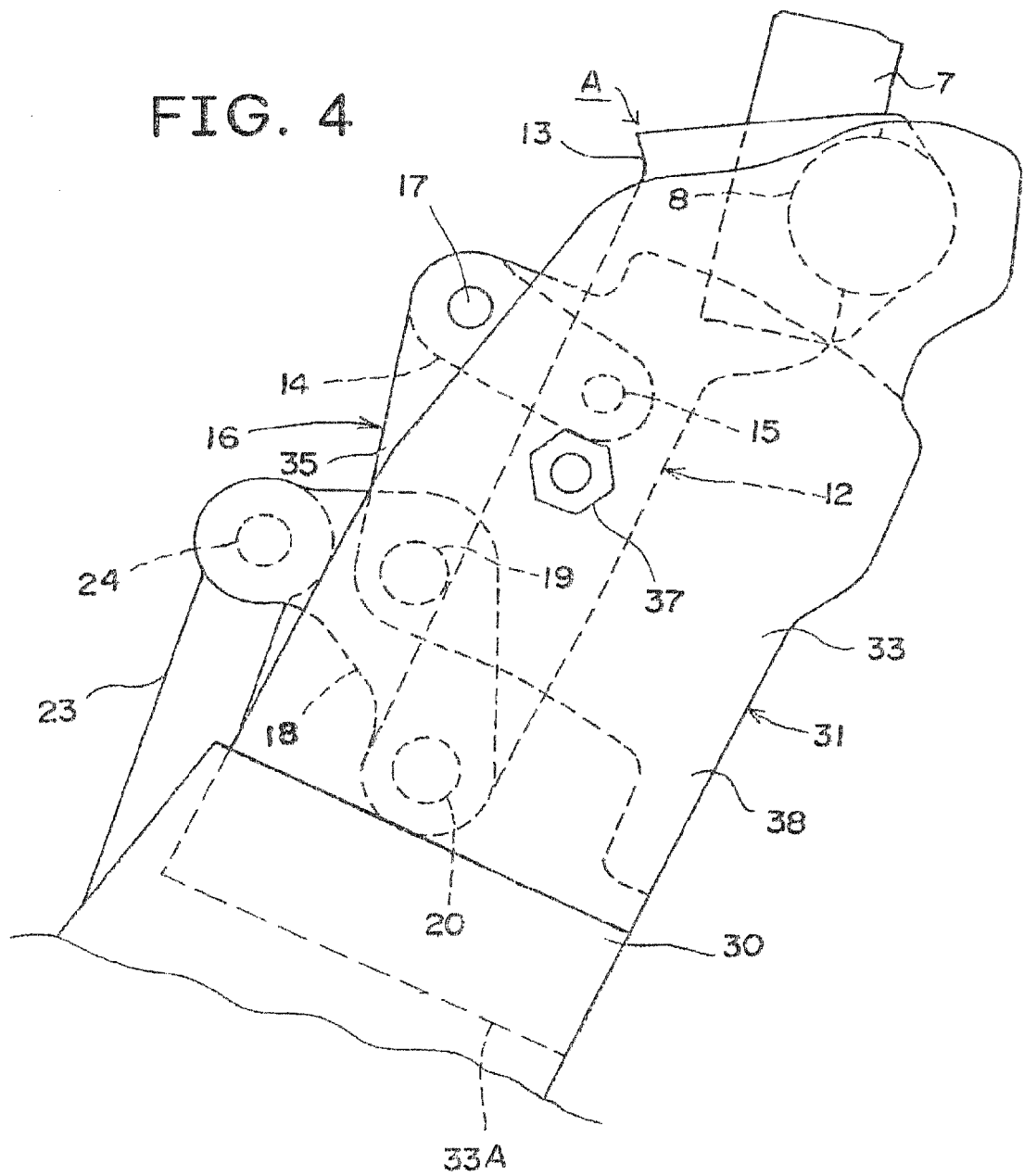
FIG. 4 is an upper magnified side view of the backrest frame.
Figure 5:
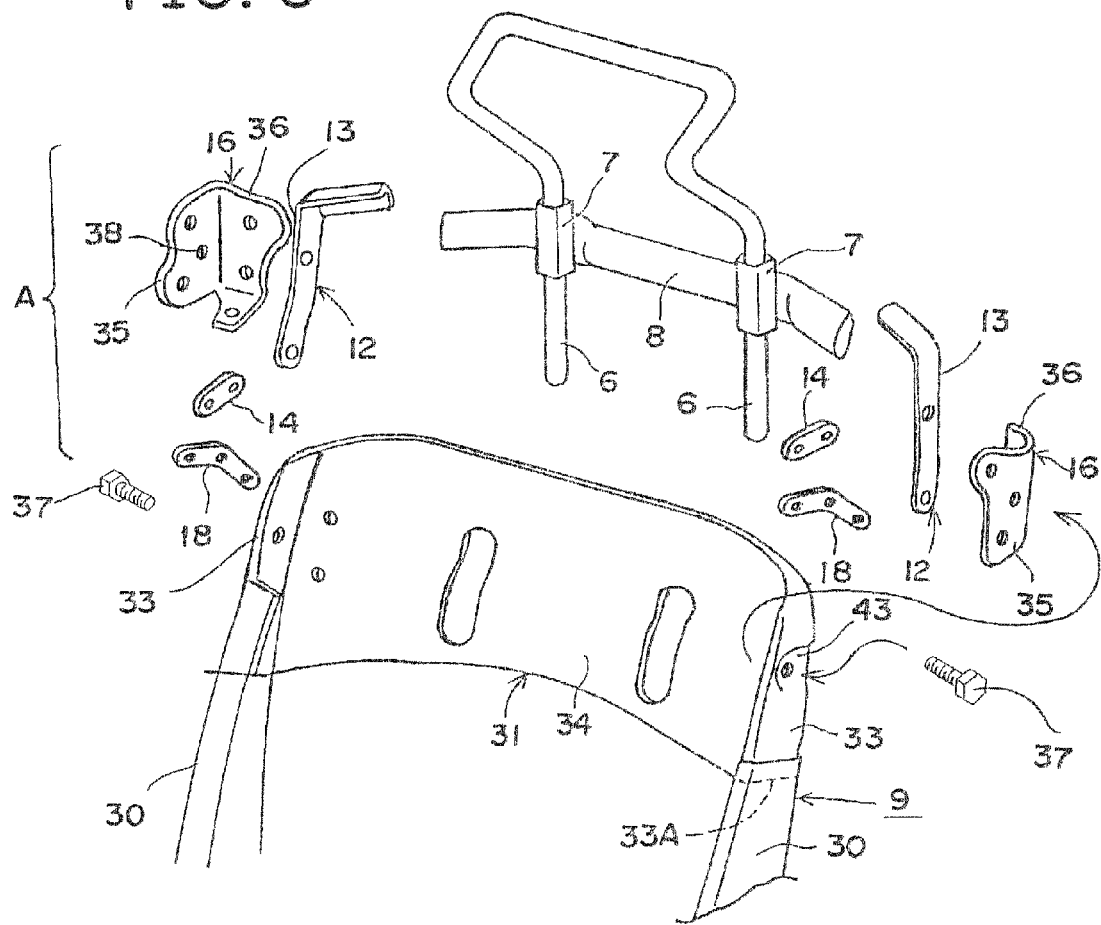
FIG. 5 is an upper exploded perspective view of the backrest frame.

A vehicle seat 1 according to an example of the invention includes a seat bottom 81 provided in a floor panel (not shown) slidably by way of a slide mechanism 80, a backrest 2 provided in the seat bottom 81 rotatably about a shaft 82, and a movable headrest 3 provided in the upper part of the backrest 2. The backrest 2 is held at an arbitrary angle to the seat bottom 81 by means of a reclining mechanism (not shown). A backrest frame 9 of the backrest 2 has a pair of side frames 30, an upper frame 31, and a lower frame 32, and is formed in square frame shape.

Pillars 6 of the headrest 3 are provided in the backrest 2 by way of an active headrest mechanism A, and the headrest 3 is movable substantially forward, in the event of vehicle rear-end collision, from the ordinary support position to a forward head protecting position due to collision load.

The active headrest mechanism A has a headrest support part 8 extended laterally along the upper frame 31. The support part 8 is movable along the backrest frame 9. Vertical engaging parts 7, in which lower parts of the pillars 6 of the headrest 3 are inserted, are fixed in the support part 8. The pillars 6 are supported by the vertical engaging parts 7 so as to be adjustable in height. The headrest mechanism A has upside link mechanisms 12, 12 disposed in the upper parts of the side frames 30 (or at right and left sides of the upper frame 31).

Each one of the upside link mechanisms 12 has a long first link 13 extended vertically, and the leading end of an arm 14 is attached to the middle point of the vertical first link 13 by means of a shaft 15. The base part of the arm 14 is attached to a bracket 16 fixed to the backrest frame 9 rotatably by way of a shaft 17. A middle point of a second link 18 is attached to the bracket 16 beneath the first link 13 by means of a shaft 19. A lower part of the first link 13 is attached to one end of the second link 18 rotatably by way of a shaft 20.

Figure 6:
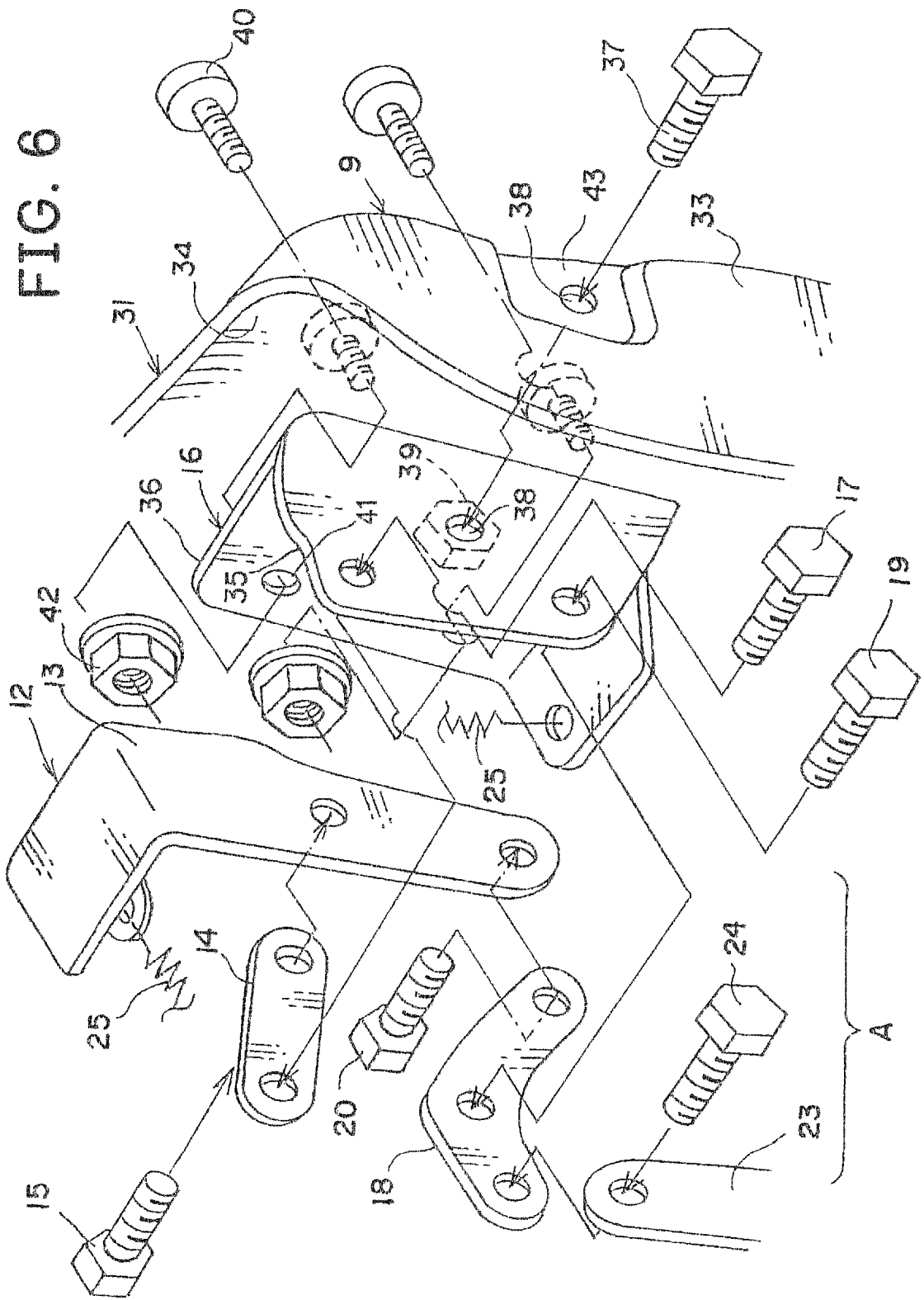
FIG. 6 is an upper exploded perspective view of the backrest frame.
Figure 7:
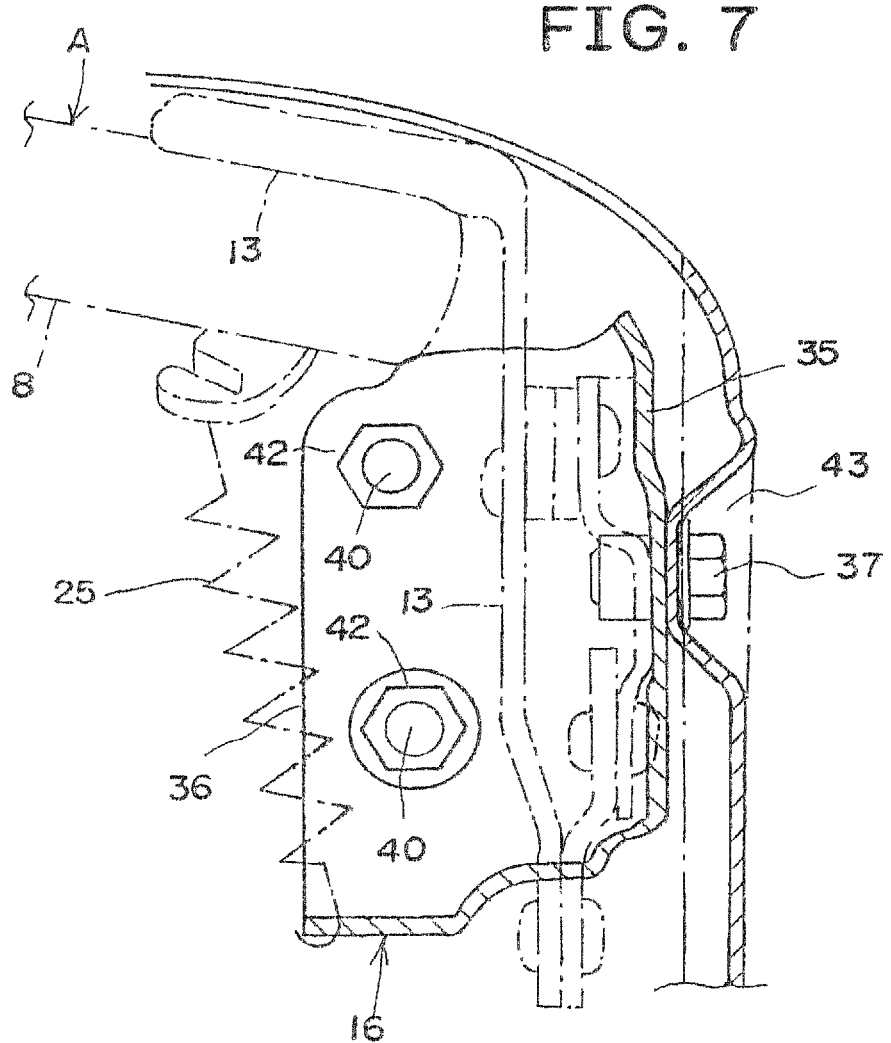
FIG. 7 is an upper front view of the backrest frame.

At the other end of the second link 18, an upper part of a transmission member 23 is coupled by way of a shaft 24. When the transmission member 23 moves downward, the first link 13 rotates counterclockwise in FIG. 6 about the shaft 15, pushes out the headrest support part 8 forward, and displaces the headrest 3 from the ordinary support position to the forward head protecting position. The first link 13 is engaged with one end of a spring 25 having the other end connected to the bracket 16, and by the elastic force of the spring 25, the headrest 3 is held in the ordinary support position.

The upper frame 31 has a central plate 34, and side plates 33, 33 projecting forward from both sides of the central plate 34, and in the central plate 34, preliminarily, a weld bolt 40 is welded and fixed to project forward.

The bracket 16 has a side portion 35 and a rear portion 36, and is formed in an L shape. An insertion hole 41 is formed in the rear portion 36, and the weld bolt 40 of the central plate 34 is inserted in the insertion hole 41 to be screwed with a nut 42, and the central plate 34 and bracket 16 are fixed.

An inside concave recess 43 is formed in the side plate 33 of the upper frame 31, and the side portion 35 of the bracket 16 abuts against the inner side of the recess 43, and the both members are fixed by a bolt 37 and a nut 39. An insertion hole 38 of the bracket 16 through which the bolt 37 passes is positioned in the middle between upper and lower shafts 17 and 19. As a result, the load applied on the bracket 16 can be effectively supported.

The active headrest mechanism A is disposed in a space surrounded by the side plates 33 and central plate 34 of the upper frame 31 and the side portions 35 of the brackets 16. That is, the upside link mechanism 12 is mounted on the upper frame 31 by way of the bracket 16, and is positioned to the side of the side plate 33 of the upper frame 31, and the headrest support part 8 is positioned ahead of the central plate 34 of the upper frame 31. As a result, the active headrest mechanism A acts on the backrest frame 9 of assured rigidity, and moves the headrest 3 forward, and thus the load occurring at this time is securely supported on the backrest frame 9.

The side plate 33 of the upper frame 31 is overlaid on the upper part of the side frame 30, and the both members are fixed at an overlapping portion 33A of the side plate 33 and side frame 30. The side plate 33 is formed nearly in the same area as the side portion 35 of the bracket 16, and the side portion 35 of the bracket 16 is fixed to the side plate 33.

The backrest frame 9 is provided with a rear-end collision sensor 45 moving backward by backward movement of the occupant in the event of collision from the rear side. The rear-end collision sensor 45 has its both sides coupled to one end of a downside link mechanism 46 provided in the backrest frame 9, and the lower part of the transmission member 23 is coupled to the other end of the downside link mechanism 46. When the rear-end collision sensor 45 moves backward by the backward movement of the occupant, this energy is transmitted to the upside link mechanism 12 by way of the downside link mechanism 46 and transmission member 23, and the upside link mechanism 12 thereby moves the headrest 3 forward, and supports the head of the occupant.

The base part of an arm 47 of the downside link mechanism 46 is journaled by a shaft 49 on a lower bracket 48 provided in the right and left side frames 30, the leading end of the arm 47 is journaled by a shaft 50 in the lower part of the transmission member 23, and in the leading end rear part of the arm 47, the right and left sides of the rear-end collision sensor 45 are mounted on a shaft 51.

The lower bracket 40 is formed in a flat plate, and is fixed to a side plate 52 of the side frame 30. The side frame 30 bends the front and rear edges of the side plate 52 to the inner side, and is formed in a flange part 53, and the peripheral edge of the lower bracket 48 abuts against or is fixed as closely as possible to the flange part 53. Preferably, the lower bracket 48 has its upper part positioned higher than at least a shaft 49 for mounting the downside link mechanism 46, and its lower part positioned lower than the leading end of the downside link mechanism 46, and the vertical length thereof is as short as possible.

Reference numeral 45A is an engaging part provided in the rear-end collision sensor 45, 46A is a stopper provided in the downside link mechanism 46, and the engaging part 45A is engaged with the stopper 46A to position the rear-end collision sensor 45 at a specified position.

Thus, the downside link mechanism 46 is formed of the arm 47, and the members of the arm 47 and upside link mechanism 12 are formed in plates, and are attached to the right and left side frames 30 of the backrest frame 9. Therefore, between the right and left side frames 30, only the rear-end collision sensor 45 is positioned in a flat plane nearly parallel to the back of the occupant, and the occupant does not feel strange or uncomfortable while seated.

The backrest frame 9 of the backrest 2 is provided with a flat support member 60. The flat support member 60 supports the upper half (from the waist and up) of the occupant. The flat support member 60 supports the upper half of the occupant by "plane", stabilizes the sitting posture, and contributes to comfortable supporting of the head by the headrest 3.

That is, in the conventional zigzag spring structure of vertical arrangement, the upper half of the occupant is supported by "line" by each zigzag spring moving backward due to load, and thus the sitting posture is not stable. Even if the headrest 3 moving forward in the event of rear-end collision supports the head, the upper half of the occupant is moved backward, and the positional relation between the head and the upper half is unstable. In the present invention, however, the entire upper half of the occupant can be supported by "plane" by the flat support member 60, and while the headrest 3 moving forward is supporting the head, the flat support member 60 supports the upper half of the occupant by "plane", so that the sitting posture of the occupant including the head is extremely stabilized.

Preferably, the flat support member 60 is formed of one plate body 61 of substantially square shape, and the plate body 61 is made of polypropylene or other synthetic resin, has specified strength to support the occupant, and is elastic enough to be deformed when the occupant receives a backward load (including the body weight) so as to support the load. As a result, the sense of the back contact called "touch" is soft and comfortable.

The flat support member 60 has its plate body 61 provided movably back and forth on the backrest frame 9 by way of a wire spring 62 such as zigzag spring or formed wire spring, and the flat support member 60 supports the occupant by moving back and forth while maintaining the plane status.

In this case, the wire spring 62 has a specific elasticity, and is flexible enough to move backward while the entire plate body 61 is holding the plate shape when a load is applied to the plate body 61. The rear-end collision sensor 45 is positioned behind the plate body 61.

More specifically, since the flat support member 60 is provided in the backrest frame 9, rear-end collision can be detected when the rear-end collision sensor 45 is provided behind the upper end or lower end of the flat support member 60, or rear-end collision can be detected securely by moving the rear-end collision sensor 45 largely in the event of rear-end collision because the backward moving amount is large in the plate intermediate portion of the flat support member 60, or when the rear-end collision sensor 45 is provided in the upper part, the flat plate member 60 of this portion is moved backward by a specified amount, and support of the upper half of the occupant is insufficient. Therefore, due to such reasons, the rear-end collision sensor 45 is positioned behind the plate intermediate portion 36. Therefore, support of the occupant by the flat support member 60, and detection of rear-end collision by the rear-end collision sensor 45 are both satisfied.

(Function of the Example)

The backrest frame 9 of the backrest 2 is formed in a square frame shape, by coupling the upper parts of the right and left side frames 30 by the upper frame 31, and the lower parts of the side frames 30 by the lower frame 32, and the flat support member 60 is provided within the square frame of the backrest frame 9. Further, the flat support member 60 has the plate body 61 of one substantially square plate provided movably back and forth on the backrest frame 9 by way of the wire spring 62. As a result, the flat support member 60 moves back and forth while substantially maintaining the shape, and supports the occupant.

The plate body 61 of the flat support member 60 is one substantially square plate, and thus the load applied only in a specific portion of the plate body 61 is dispersed vertically and laterally as the entire plate body 61 moves backward, so that the occupant is supported securely.

When the occupant is moved backward by inertia in the event of a rear-end collision, the rear-end collision sensor 45 moves backward, and by the backward movement of the rear-end collision sensor 45, the downside link mechanism 46 is rotated, the transmission member 23 is pulled downward, the transmission member 23 rotates the shaft 24 of the second link 18 downward, and the second link 18 rotates the shaft 19 upward, thereby pushing up the lower part of the first link 13, the first link 13 makes a circular motion about the shaft 17 by means of the arm 14 when the shaft 15 is pushed up, and the headrest 3 moves forward from the center of the shaft 17. Therefore, the headrest 3 supports the head by rotating forward by means of the upside link mechanism 12 of the active headrest mechanism A, thereby preventing whiplash.

In this case, the upside link mechanism 12 moves the first link 13 by the second link 18 and the arm 14, and thus the moving amount of the headrest support part 8 of the first link 13 is much larger than the moving amount of the rear-end collision sensor 45 (the vertical moving amount of the transmission member 23), and the headrest 3 positioned higher than the headrest support part 8 is further increased in the forward moving distance, and the moving amount is sufficiently assured, so that the head of the occupant can be securely supported.

In the event of rear-end collision, the headrest 3 moves ahead of the backrest 2 by means of the active headrest mechanism A, and supports the head securely, and the active headrest mechanism A is composed of the headrest support part 8 in lateral direction mounting the vertical engaging portions 7 supporting the pillars 6, and the upside link mechanism 12 for moving the headrest support part 8 ahead of the backrest 2. The upside link mechanism 12 is attached to the upper frame 31 through the bracket 16, the weld bolt 40 is fixed to the middle plate 34 of the upper frame 31 preliminarily, and the side portion 35 of the bracket 16 is fixed to the side plate 33 of the upper frame 31 by means of the bolt 37. Therefore, the bracket 16 has the side portion 35 and rear portion 36 thereof fixed to the upper frame 31 by means of the bolt 37 and weld bolt 40. As a result, the load applied to the active headrest mechanism A is securely supported by the bracket 16 and upper frame 31.

The side portion 35 of the bracket 16 abuts against the recess 43 of the side plate 33 of the upper frame 31, and is fixed by the bolt 37, and hence the recess 43 of the upper frame 31 acts like a reinforcing rib, and supports the load applied on the active headrest mechanism A, thereby enhancing the rigidity of the backrest frame 9.

The recess 43 projects to the inner side, and the bolt head of the bolt 37 can be placed within the recess, so that the cushion member may be attached (and detached) easily, and damage of the cushion member is suppressed.

In this case, the bracket 16 is fixed by the nut 42 as the weld bolt 40 of the central plate 34 of the upper frame 31 is inserted in the insertion hole 41 of its rear portion 36, and the side portion 35 abuts against the recess 43 of the side plate 33 of the upper frame 31, and is fixed by the bolt 37. Therefore, only by forming the insertion hole 38 and weld bolt 40, the upper frame 31 can be used commonly with the backrest frame 9 not having the active headrest mechanism A, and thereby the cost is saved.

In particular, in the case of the backrest frame 9 not having the active headrest mechanism A, the upper frame 31 is formed thinly, but in spite of the thin plate thickness, the rigidity is assured because the active headrest mechanism A is provided through the bracket 16, and a rational structure is designed when using commonly with the backrest frame 9 not having the active headrest mechanism A.

Thus, the backrest frame 9 is formed by coupling the upper parts of the right and left side frames 30 by the upper frame 31, the upper frame 31 is formed in a single plate by means of the right and left side plates 33 and central plate 34, and the active headrest mechanism A is positioned in a space surrounded by the side plates 33 and central plate 34 of the upper frame 31 and the side portions 35 of the brackets 16. Therefore, even if an impact load is applied by rear-end collision, the right and left side plates 33 of the upper frame 31 are not opened to the outer side or not deformed. That is, when an oblique rear load is applied on the headrest 3, the right and left side plates 33 of the upper frame 31 are opened to the outer side, but such deformation is prevented.

Therefore, the backrest frame 9 is not deformed by the motion of the active headrest mechanism. A, and when the headrest 3 supports the head by the active headrest mechanism A, the backrest frame 9 is not deformed, the head and the whole body of the occupant may be securely supported by high rigidity, and especially the posture of the sitting occupant including the head can be held favorably.

The right and left side plates 33 of the upper frame 31 are formed so as to overlap partly with the side frame 30 in lateral direction, and the side plates 33 and the side frame 30 are bonded and fixed in the overlapping part 33A of the side plates 33 and side frame 30. Therefore, the upper part of the upper frame 31 becomes a mutual reinforcing member of the right and left side plates 33 and central plate 34, and thus the rigidity against torsional load is enhanced. That is, although a stress is concentrated on the junction area of the upper frame 31 and side frame 30, this junction area can be set considerably lower than the upper part of the backrest frame 9, and hence the load applied to the upper frame 31 is decreased by the corresponding amount. Therefore, the side plates 33 can support the load rigidly when mounting the upside link mechanism 12 of the active headrest mechanism A, so that a rational structure is realized.

The overlapping part 33A of the side plates 33 and side frame 30 is formed between the lower part of the side plates 33 of the upper frame 31 and the upper part of the side frame 30, and welded and fixed at the overlapping part 33A. Therefore, the interval between the side frame 30 and the fixing portion of the upper frame 31 and lower frame 32 is shortened, and the rigidity near the overlapping portion 33A of the side plates 33 and side frame 30 is enhanced, and in this respect as well, the rigidity against torsional load is enhanced.

The side plates 33 are formed nearly in the same area as the side portion 35 of the bracket 16, and thus the side portion 35 of the bracket 16 can be fixed to the side plates 33. Hence, the bracket 16 may be firmly fixed to the side plates 33, so that the rigidity of the upper frame 31 including the side plates 33 may be enhanced.

The downside link mechanism 46 for operating the active headrest mechanism A is journaled on the lower bracket 46 by the shaft 49, and the lower bracket 46 is formed in a flat plate and is fixed to the side plate 52 of the side frame 30. Hence, when the rear-end collision sensor 45 receives an impact to actuate the active headrest mechanism A, the load applied to the downside link mechanism 46 is supported by the lower bracket 48 and side frame 30.

Therefore, by reducing the weight of the upside portion of the backrest frame usually lower in the applied load out of the entire backrest frame 9, the rigidity of the backrest frame 9 is reinforced by the lower bracket 46 in the vicinity of the rear-end collision sensor 45 where the load is applied, so that the backrest frame 9 realizes reduction of weight and enhancement of rigidity at the same time on the whole.

In this respect, not only is the backrest frame 9 reduced in weight, but also the rigidity of the backrest frame 9 is improved by fixing the bracket 16 to the upper frame 31 for mounting the active headrest mechanism A. Therefore, the backrest frame 9 is reduced in weight by reducing the entire thickness by the bracket 16 and lower bracket 48, so that the vehicle seat not mounting the active headrest mechanism A and the backrest frame 9 can be commonly used, and a rational structure is realized.

The peripheral edge of the lower bracket 48 abuts against or closely fixed to the flange part 53 of the sided frame 30, and hence the rigidity of the side frame 30 in the mounting portion of the downside link mechanism 46 is enhanced. The lower bracket 48 at least has its upper part positioned higher than the shaft 49 for mounting the downside link mechanism 46, and its lower part is positioned lower than the leading end of the downside link mechanism 46, and therefore the lower bracket 48 may be formed to be as small as possible, and the rigidity of the backrest frame 9 may be enhanced with a minimum size.

The invention claimed is:

1. A vehicle seat characterized by mounting a headrest movably back and forth on a backrest frame by an active headrest mechanism, providing the backrest frame with a rear-end collision sensor for sensing backward movement near a waist of an occupant in the event of rear-end collision, and coupling the rear-end collision sensor and the active headrest mechanism through a link mechanism, thereby supporting a head of the occupant by moving the headrest forward by backward movement of the rear-end collision sensor,
   wherein the active headrest mechanism is composed of a headrest support part in lateral direction provided with a vertical engaging part for supporting a pillar of the headrest, and an upside link mechanism for moving the headrest support part ahead of the backrest,
   a bracket mounting the upside link mechanism on an upper frame of one plate material of the backrest frame, and
   wherein the upper frame is a single plate formed of right and left side plates and a central plate,
   the bracket is formed in a die pattern of side portions and a rear portion,
   the rear portion abuts against the central plate of the upper frame, and
   the side portions abut against the side plates of the upper frame, and are fixed by bolts.

2. The vehicle seat according to claim 1 wherein the backrest frame of the backrest is formed in a square frame shape by mutually coupling the upper parts of right and left side frames by the upper frame, and lower parts of the side frames by a lower frame, respectively, the upper frame is provided with the active headrest mechanism, and
   the headrest support part and the upside link mechanism are mounted at an inside portion of the right and left side plates of the upper frame, and at the front side of the central plate.

3. The vehicle seat according to claim 1, wherein the right and left side plates of the upper frame are provided with a recess sinking inside,
   the inner side of the recess abuts against the side portion of the bracket and fixed by a bolt,
   and a bolt head of the bolt is positioned within the recess.

4. The vehicle seat according to claim 1, wherein a weld bolt is preliminarily fixed in the central plate of the upper frame, and
   the rear portion of the bracket is fixed by the weld bolt.

5. A method of assembling a vehicle seat in mounting a headrest movably back and forth on a backrest frame by an active headrest mechanism, comprising the steps of:
   providing the active headrest mechanism with a headrest support in lateral direction provided with a vertical engaging for supporting a pillar of the headrest, and an upside link mechanism for moving the headrest support part ahead of the backrest,
   preliminarily fixing a weld bolt in a central plate of an upper frame of the backrest frame,
   preliminarily fixing a nut in a side portion of the bracket, forming an insertion hole of the rear portion of the bracket for the weld bolt,
   positioning the side portion of the bracket to abut against a recess of a side plate of the upper frame,
   screwing the nut and the weld bolt together so as to be fixed with each other,
   forming the upper frame as a single plate formed by right and left side plates and a central plate,
   forming the bracket in a die pattern of side portions and a rear portion,
   positioning the rear portion to abut against the central plate of the upper frame, and
   positioning the side portions to abut against the side plates of the upper frame, and fixing the side portions to the side plates of the upper frame by bolts.

* * * * *